F. EBERT.
Horse Hay Fork.
No. 89,920.
Patented May 11, 1869.
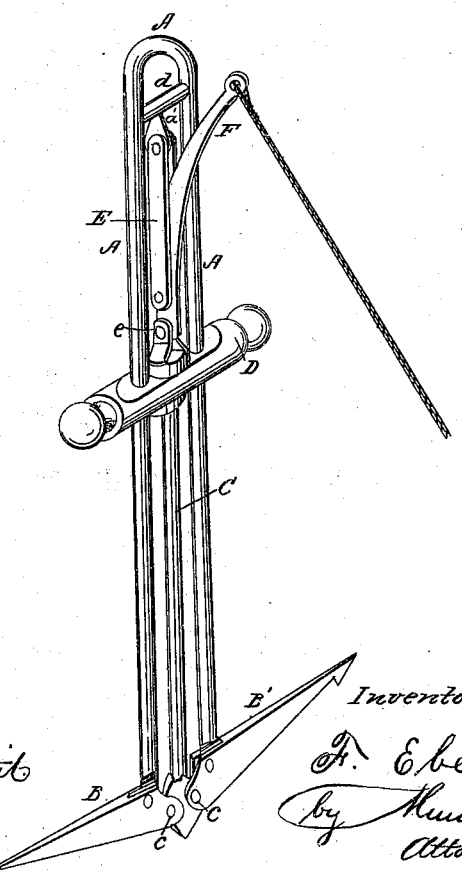

United States Patent Office.

FREDERICK EBERT, OF SAXONBURG, PENNSYLVANIA.

Letters Patent No. 89,920, dated May 11, 1869.

IMPROVEMENT IN HORSE HAY-FORKS.

The Schedule referred to in these Letters Patent and making part of the same.

To all whom it may concern:

Be it known that I, FREDERICK EBERT, of Saxonburg, in the county of Butler, and State of Pennsylvania, have invented a new and improved Horse Hay-Rake; and I do hereby declare that the following is a full, clear, and exact description of the construction and operation of the same, reference being had to the accompanying drawings, making a part of this specification, in which my invention is represented by a perspective view.

In this invention the penetrating point of the instrument is formed of two opening and closing teeth, operated by a central rod, with a tripping and locking-lever of peculiar construction and operation.

When the teeth are closed, they form a cutting-point; when opened they operate as lifting-arms, which hold and raise the hay.

In the drawings, A is a bent rod, having a brace, $a$, across its upper end, so as to form an eye, $a^2$, by which to raise and lower the instrument, and having the two teeth B B' articulated to its lower extremities.

C is a central rod, articulated, at its lower end, to lugs $c$ $c$, at the inner upper edges of the teeth B B', as seen in the drawing, so that by raising the rod it opens the teeth, as seen in the drawing, while, by depressing it, the teeth are shut together, so as to make a single penetrating point.

The upper end of the central rod is connected to a sliding block, or plate, D, which travels up and down on the side-rods A A as guides.

E is a link, articulated to the cross-tie, or brace, $a$, or a lug, $a^1$, thereon, and forming a swinging fulcrum, to support a curved lever, F, the lower end of which, below the fulcrum $e$, is articulated to the upper end of rod C, or a link or lug connected therewith.

By raising the end of lever F, the rod C and link E are brought into line with each other, so as to lock the arms B B' firmly in position, and hold the hay securely while it is being elevated.

When the hay has reached the desired elevation, a pull upon the cord H brings down the end of lever F, raising rod C, and allowing the arms B B' to close together and drop the hay. In that condition the instrument is again lowered and thrust into the hay, after which the end of lever F is again raised, expanding the arms B B', and locking them in the position shown in the drawings, as before.

Having thus described my invention,

What I claim as new, and desire to secure by Letters Patent, is—

The arrangement shown and described of the sliding block or plate D, and cross-tie or brace $a$, and lug $a^1$, with relation to the bent rod A, link E, lever F, sliding rod C, and articulated arms B B', as and for the purpose specified.

To the above specification of my invention, I have signed my hand, this 2d day of March, 1869.

FREDERICK EBERT.

Witnesses:
CHAS. A. PETTIT,
F. C. BEACH.